(12) United States Patent
Hair, Jr. et al.

(10) Patent No.: US 8,972,035 B2
(45) Date of Patent: Mar. 3, 2015

(54) UNIFORMITY CORRECTION BY ABLATION AT DIFFERENT TRACK LOCATIONS ALONG A TIRE BEAD

(75) Inventors: Clarence Vernon Hair, Jr., Greenville, SC (US); Verner Steve Nicholsen, Pelzer, SC (US); Jean-Baptiste Rousseau, Saint-Bonnet-Pres-Riom (FR); James Edward Stone, Greenville, SC (US)

(73) Assignees: Michelin Recherche et Technique S.A., Granges-Paccot (CH); Compagnie Generale des Etablissements Michelin, Clermont-Ferrand (FR)

( * ) Notice: Subject to any disclaimer, the term of this patent is extended or adjusted under 35 U.S.C. 154(b) by 404 days.

(21) Appl. No.: 13/378,485

(22) PCT Filed: Jun. 11, 2010

(86) PCT No.: PCT/US2010/038297
§ 371 (c)(1),
(2), (4) Date: Dec. 15, 2011

(87) PCT Pub. No.: WO2011/002596
PCT Pub. Date: Jan. 6, 2011

(65) Prior Publication Data
US 2012/0095587 A1    Apr. 19, 2012

Related U.S. Application Data

(60) Provisional application No. 61/221,627, filed on Jun. 30, 2009.

(51) Int. Cl.
*G06F 17/00*    (2006.01)
*E01C 23/00*    (2006.01)
(Continued)

(52) U.S. Cl.
CPC .................................. *G01M 17/024* (2013.01)
USPC ............................. 700/110; 73/146; 425/58.1

(58) Field of Classification Search
CPC ...................................................... G01M 17/024
USPC ............................. 700/110; 73/146; 425/58.1
See application file for complete search history.

(56) References Cited

U.S. PATENT DOCUMENTS 4,041,647 A    8/1977    Ugo
4,836,260 A    6/1989    Corner et al.
(Continued)

FOREIGN PATENT DOCUMENTS

EP    0 304 287      2/1989
FR       214179 A1   6/1995
JP    H01139245      5/1989

OTHER PUBLICATIONS

Ignacio et al. "Improved Procedures for Estimating Amplitudes and Phases of Harmonics with Application to Vibration Analysis" from "IEEE Transactions on Instrumentation and Measurement, vol. 47, No. 1, Feb. 1998".*

(Continued)

*Primary Examiner* — Mohammad Ali
*Assistant Examiner* — Yuhui R Pan
(74) *Attorney, Agent, or Firm* — Dority & Manning, P.A.

(57) ABSTRACT

A system and method for reducing the magnitude of one or more harmonics of one or more uniformity parameters in a cured tire involves selective removal of tire material at one or more track/area locations along first and second bead profiles. Selective removal may occur via ablation at the bead seat, low flange and/or high flange zones to correct for a selected number of harmonics of such parameters as radial, lateral and tangential force variation. Ablation patterns are calculated and implemented on first and second tire beads to achieve desired levels of force reduction at selected angular locations (within the expanse from 0-360 degrees along each tire bead). Ablation patterns may be calculated for implementation at fixed or varied tire rotational speeds and/or fixed or varied levels of laser power.

10 Claims, 12 Drawing Sheets

(51) Int. Cl.
*G01M 17/02* (2006.01)
*B29D 29/00* (2006.01)

(56) References Cited

U.S. PATENT DOCUMENTS

| | | | |
|---|---|---|---|
| 4,912,882 A | | 4/1990 | Makino et al. |
| 5,050,656 A | | 9/1991 | Ho |
| 5,060,510 A | * | 10/1991 | Rousseau .................. 73/146 |
| 5,144,996 A | * | 9/1992 | Kinuhata et al. ............... 157/13 |
| 5,478,426 A | * | 12/1995 | Wiler et al. ................ 156/272.8 |
| 5,537,866 A | * | 7/1996 | Bangert et al. ............... 73/146 |
| 5,616,859 A | * | 4/1997 | Rhyne ............................ 73/146 |
| 6,279,630 B1 | | 8/2001 | Herbert |
| 6,615,885 B1 | | 9/2003 | Ohm |
| 7,201,194 B2 | | 4/2007 | Rhyne et al. |
| 7,264,447 B2 | | 9/2007 | Ono et al. |
| 2005/0230022 A1 | * | 10/2005 | Guerinon et al. ............ 152/543 |
| 2007/0144657 A1 | * | 6/2007 | Flament et al. ............ 156/110.1 |
| 2007/0145623 A1 | * | 6/2007 | Hair ........................... 264/40.1 |

OTHER PUBLICATIONS

Zyung et at. "Ultrafast imaging of 0.532-um laser ablation of polymers: Time evolution of surface damage and blast wave generation" from "Journal of Applied Physics", vol. 65, p. 4548-4563, Jun. 1989.*

PCT International Search Report for PCT/US2010/038297, Dated Jun. 30, 1 2009.

PCT International Search Report for PCT/US2010/038295, Dated Aug. 19, 2010.

* cited by examiner

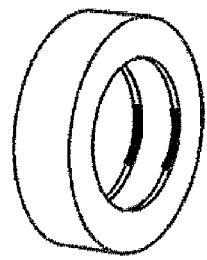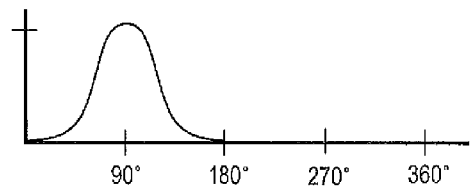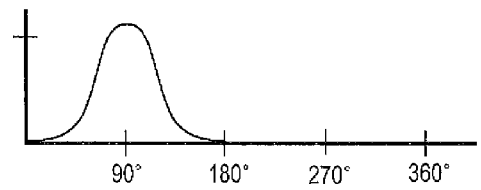
FIG. 11A  FIG. 11B  FIG. 11C
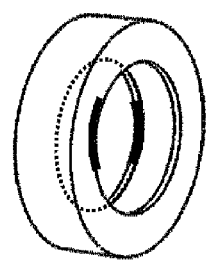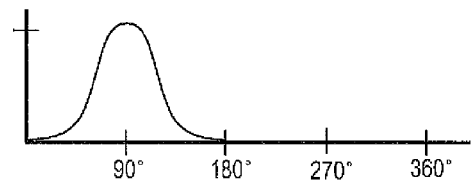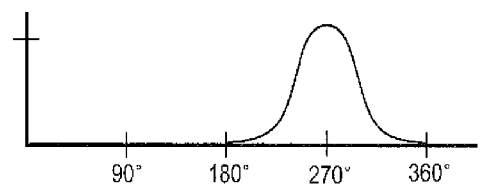
FIG. 12A  FIG. 12B  FIG. 12C

UNIFORMITY CORRECTION BY ABLATION AT DIFFERENT TRACK LOCATIONS ALONG A TIRE BEAD

PRIORITY CLAIM

This application claims priority to U.S. Provisional Patent Application No. 61/221,627 filed on Jun. 30, 2009.

FIELD OF THE INVENTION

The invention generally relates to systems and methods for improving tire uniformity by selective removal of material along tire bead locations in a cured tire.

BACKGROUND OF THE INVENTION

Tire non-uniformity relates to the symmetry (or lack of symmetry) relative to the tire's axis of rotation in certain quantifiable characteristics of a tire. Conventional tire building methods unfortunately have many opportunities for producing non-uniformities in tires. During rotation of the tires, non-uniformities present in the tire structure produce periodically-varying forces at the wheel axis. Tire non-uniformities are important when these force variations are transmitted as noticeable vibrations to the vehicle and vehicle occupants. These forces are transmitted through the suspension of the vehicle and may be felt in the seats and steering wheel of the vehicle or transmitted as noise in the passenger compartment. The amount of vibration transmitted to the vehicle occupants has been categorized as the "ride comfort" or "comfort" of the tires.

Tire uniformity characteristics, or attributes, are generally categorized as dimensional or geometric variations (radial run out (RRO) and lateral run out (LRO)), mass variance, and rolling force variations (radial force variation, lateral force variation and tangential force variation, sometimes also called longitudinal or fore and aft force variation). Uniformity measurement machines often measure the above and other uniformity characteristics by measuring force at a number of points around a tire as the tire is rotated about its axis.

Once tire uniformity characteristics are identified, correction procedures may be able to account for some of the uniformities by adjustments to the manufacturing process. Some of the uniformities may be hard to correct during the manufacturing process and so additional correction procedures are needed to correct remaining non-uniformities of cured tires. A number of different techniques may be available, including but not limited to the addition and/or removal of material to a cured tire and/or deformation of a cured tire. Some of the known uniformity correction techniques are limited in their application, for example in precision control and/or in the types of tires that are correctable via such techniques. For example, low profile tires having reduced sidewall height may be particularly difficult to correct using known uniformity correction techniques. Known techniques may also be limited in the type of uniformity parameters that are correctable.

Examples of known systems in which tire material is removed to improve uniformity include U.S. Pat. Nos. 4,041,647 and 5,537,866. U.S. Pat. No. 4,041,647 (Ugo) relates to improving the uniformity of a pneumatic tire by measuring and correcting excessive variation in the free radial run-out of the tire during such rotation of the tire. U.S. Pat. No. 5,537,866 (Bangert et al.) discloses a method for correcting tire imbalance of a tubeless pneumatic tire including in part a step of removing at locations, where the value of a measured radial parameter is greater than the minimum plus the threshold value, tire material from the radially inwardly facing seat surface of the tire bead at least to such an extent that the remaining tire imbalance is within a given tolerance range.

An example of correcting non-uniformities by adding material is disclosed in U.S. Pat. No. 5,060,510 (Rousseau), which discloses a method of correcting the variations of radial force between a tire and the ground, including in part a step of effecting correction by means of wedges in the form of circular rings placed between the mounting rim and the beads of the tire.

Examples of known systems in which tire uniformity is corrected without grinding, but instead by deformation, are disclosed in U.S. Pat. No. 5,616,859 (Rhyne) and U.S. Published Application No. US 2007/0145623 A1 (Hair, J R.). U.S. Pat. No. 5,616,859 (Rhyne) discloses a method and apparatus for reducing the magnitude of a uniformity characteristic in a cured tire, whereby at least a portion of one carcass reinforcing member of the tire is permanently deformed a predetermined amount, for example by variable stretching of at least a portion of a carcass reinforcing member beyond its elastic limit for a predetermined amount of time. U.S. Patent Application Publication No. US 2007/0145623 A1 (Hair, J R.) discloses an apparatus and method for reducing the magnitude of multiple harmonies of uniformity characteristics in a cured tire by utilizing a ring containing multiple plates to permanently deform portions of the carcass reinforcing member of the tire at various identified locations.

In light of the need for providing effective and efficient solutions for correcting non-uniformities in a cured tire, it is desirable to provide a new correction method that offers precision correction control by selective removal at one or more different tire bead locations to correct one or more harmonics of one or more multiple uniformity parameters. Although known technology for uniformity correction has been developed, no design has emerged that generally encompasses all of the desired characteristics as hereafter presented in accordance with the subject technology.

SUMMARY OF THE INVENTION

In view of the recognized features encountered in the prior art and addressed by the present subject matter, an improved apparatus and methodology has been provided to correct non-uniformities of a cured tire by selectively removing material along tire bead locations.

One exemplary embodiment of the present subject matter relates to a method for reducing the magnitude of one or more harmonics of at least one uniformity parameter in a cured tire. Possible uniformity parameters for correction include one or more of radial and lateral force variations at low and/or high speeds, as well as others such as tangential force variation, radial run out, lateral run out, mass variance, conicity and ply steer. Correction may be focused on addressing a selected number of harmonics for each uniformity parameter of interest, such as one, two, three, four, five or more harmonics or all harmonics constituting the complete cyclic waveform of a uniformity parameter.

Once uniformity parameters (and an optionally selected set of harmonics of interest) are identified, at least one ablation pattern for each of first and second tire beads is calculated. The at least one ablation pattern is defined relative to the angular location around each first and second tire bead. Ablation patterns may be determined at one or more track locations along a bead profile, such as identified in the bead seat, low flange, and/or high flange profile zones. In one particular example, an ablation pattern is determined in accordance with the following formula:

$$\text{Ablation}(\theta) = \sum_h Amp_k * \text{Cos}(\theta \cdot h + \varphi_h),$$

where Ablation(θ)=ablated depth at angular position θ around the tire bead, $Amp_k$=weighted correction amplitude for uniformity parameter k, h=Harmonic number, and $\varphi_h$ is the phase of harmonic h for parameter k.

In further particular embodiments, adjustments can be made during or after the calculation of an ablation pattern. For example, the harmonic phase $\varphi_h$ may be adjusted by 180 degrees for applicable portions of the ablation pattern if the at least one uniformity parameter identified for correction comprises lateral force variation or if the track location for ablation comprises the low flange zone. The ablation pattern may also be adjusted to account for non-linearities in the actual ablation implementation. All or only selected portions of the ablation pattern may be chosen for implementation. For example, one or more angular ranges may be selected between 0 and 360 degrees at which removal along the tire bead will be implemented. One such range may actually correspond to the entire 360-degree expanse of each tire bead.

Once the one or more ablation patterns are calculated, uniformity correction methods involve a step of selectively removing tire material in accordance with the calculated ablation pattern(s). In some embodiments, the ablation may utilize either variable speed and/or variable power approaches. In a variable speed approach, the ablation device is operated at a fixed power level, while selectively rotating the cured tire with varied rotational speed. In a variable power approach, the cured tire is rotated at a fixed speed and the ablation device is powered at varied levels to accomplish the desired ablation pattern.

In addition to various methodologies, it is to be understood that the present subject matter equally relates to associated systems, including various hardware and/or software components that may be provided in a tire uniformity correction system. Software may be provided for calculating or defining desired ablation patterns defining certain levels of uniformity correction, and hardware may be provided to implement such ablation patterns.

In one exemplary embodiment, the present subject matter concerns a uniformity correction system for reducing the magnitude of one or more harmonics of at least one uniformity parameter in a cured tire. Such a system may include such exemplary elements as a fixture on which a tire is securely mounted for selective rotation, an ablation device oriented relative to the fixture and a computer control system coupled to the ablation device and the tire fixture for selectively controlling the tire rotational speed and ablation power such that tire material is selectively removed in accordance with a plurality of ablation patterns along at least one bead of a tire mounted on the fixture. Each pattern in the plurality of ablation patterns is designed for ablation at a different track location defined along the profile of the at least one bead, and defined in one or more of the bead seat, low flange and high flange zones of the profile.

In more particular exemplary embodiments, the ablation device may comprise one or more of a laser, a grinder, a sandblaster and a water jet. In one embodiment, the computer control system may further control the tire rotational speed to occur at a fixed speed and control the ablation power to occur at varied levels to implement the one or more calculated ablation patterns that are programmed into the computer control system. Alternatively, the computer control system may control the ablation power to occur at a fixed level (e.g., maximum power) and control the tire rotational speed to occur at varied levels to implement the one or more calculated ablation patterns that are programmed into the computer control system.

In more particular embodiments, the computer control system may comprise such internal components as at least one memory device configured to store information defining the one or more calculated ablation patterns and computer-executable instructions and at least one processor. The at least one processor is coupled to the at least one memory device for executing the computer-executable instructions stored therein and causing the computer control device to function as a special purpose machine for controlling the ablation device and the fixture such that selective removal of tire bead material is accomplished in accordance with the one or more calculated and programmed ablation patterns. Such memory device may be further configured to store information defining scaling factors to weight the desired level of correction for each uniformity parameter and track location for ablation. Additional information stored in the memory device may define a selected angular portion of each tire bead at which selective removal of tire material should occur, wherein the selected angular portion comprises one or more ranges that are less than the entire 360 degree tire expanse. Still further stored information may include information defining a selected number of harmonics of interest for one or more uniformity parameters of interest for correction in accordance with the one or more calculated ablation patterns.

Additional embodiments of the present subject matter, not necessarily expressed in the summarized section, may include and incorporate various combinations of aspects of features, components, or steps referenced in the summarized embodiments above, and/or other features, components, or steps as otherwise discussed in this application. Those of ordinary skill in the art will better appreciate the features and aspects of such embodiments, and others, upon review of the remainder of the specification.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 11A provides a perspective view of a tire showing relative ablation locations for uniformity correction of first harmonic radial force variation;

FIGS. 11B and 11C provide graphical views of the ablation depth versus angular location for first and second tire beads, respectively, corresponding to the ablation shown in FIG. 11A for radial force variation correction;

FIG. 12A provides a perspective view of a tire showing relative ablation locations for uniformity correction of first harmonic lateral force variation;

FIGS. 12B and 12C provide graphical views of the ablation depth versus angular location for first and second tire beads, respectively, corresponding to the ablation shown in FIG. 12A for lateral force variation correction;

Figure 1:
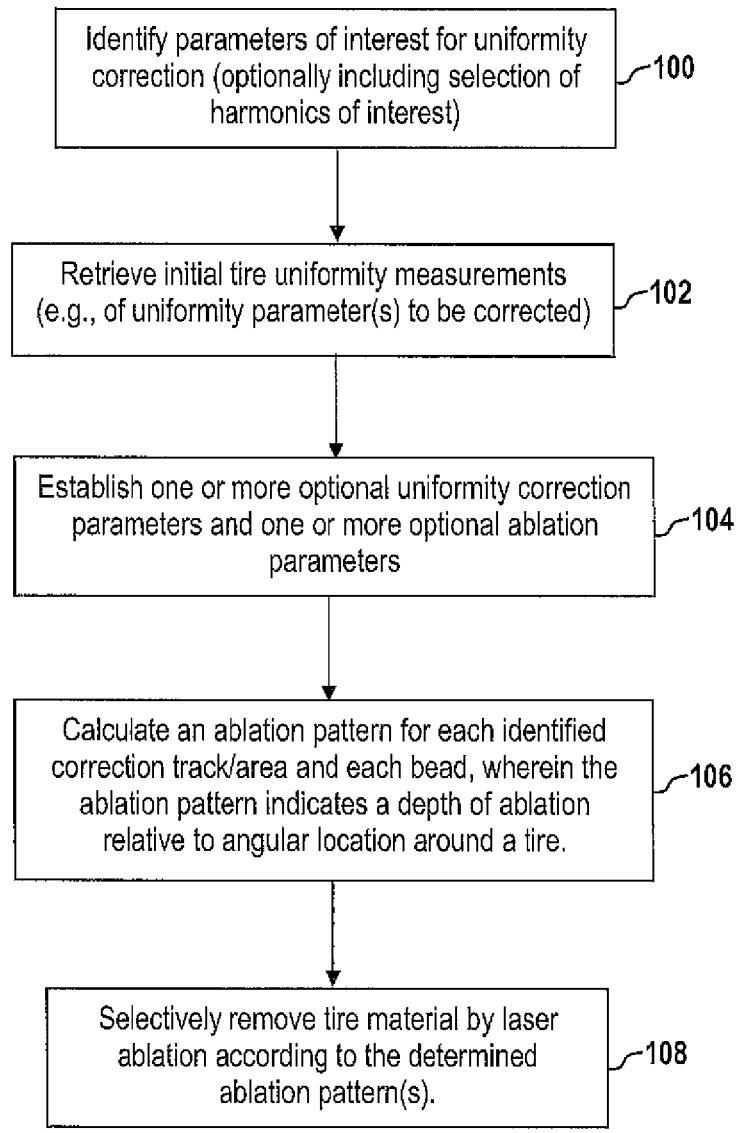
FIG. 1 provides a flow chart of exemplary steps and features in a method of reducing the magnitude of one or more uniformity parameters in a cured tire in accordance with aspects of the present invention.

Repeat use of reference characters throughout the present specification and appended drawings is intended to represent same or analogous features, elements or steps of the present invention.

DETAILED DESCRIPTION OF THE PREFERRED EMBODIMENTS

As discussed in the Summary of the Invention section, the present subject matter is particularly concerned with a system and method for correcting non-uniformity characteristics of a cured tire by selectively removing material along tire bead locations using laser ablation at different bead locations.

Selected combinations of aspects of the disclosed technology correspond to a plurality of different embodiments of the present invention. It should be noted that each of the exemplary embodiments presented and discussed herein should not insinuate limitations of the present subject matter. Features or steps illustrated or described as part of one embodiment may be used in combination with aspects of another embodiment to yield yet further embodiments. Additionally, certain features may be interchanged with similar devices or features not expressly mentioned which perform the same or similar function.

Figure 3:
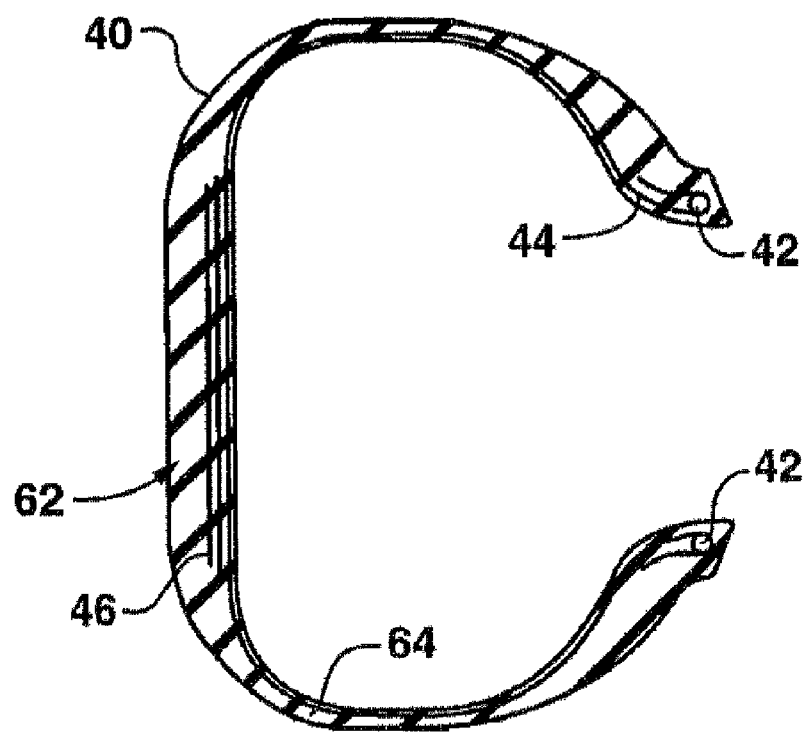
FIG. 3 is a cross-sectional view of a radial tire, which may be corrected via the system and methodology of the present invention.

FIG. 3 provides a schematic illustration of a radial pneumatic tire 40 for uniformity correction in accordance with the present invention. The tire 40 is rotatable about a longitudinal central axis of rotation. The tire 40 includes a pair of bead wires 42 which are substantially inextensible in a circumferential direction. The first and second beads 42 are spaced apart in a direction parallel to the central axis. Circumferential is defined as being substantially tangent to a circle having its center at the axis and contained in a plane parallel to the mid-circumferential plane of the tire.

A carcass ply 44 extends between each of the respective beads 42. The carcass ply 44 has a pair of axially opposite end portions which extend around the respective bead 42. The carcass ply 44 is secured at the axially opposite end portions to the respective bead 42. The carcass ply 44 includes a plurality of substantially radially extending reinforcing members each of which are made of a suitable configuration and material, such as several polyester yarns or filaments twisted together. It will be apparent that the carcass ply 44 is illustrated as a single ply but may include any appropriate number of carcass plies for the intended use and load of the tire 40. It will also be apparent that the reinforcing member may be a monofilament or any other suitable configuration or material.

The tire 40 illustrated also includes a belt package 46. The belt package 46 includes at least two annular belts. One of the belts is located radially outwardly of the other belt. Each belt includes a plurality of substantially parallel extending reinforcing members made of a suitable material, such as a steel alloy. The tire 40 also includes rubber for the tread 62 and sidewalls 64. The rubber may be of any suitable natural or synthetic rubber, or combination thereof.

As will be appreciated from the remaining description, the subject steps and features for correcting uniformity characteristics of a radial tire 40 as illustrated in FIG. 3 are generally directed to alteration of the tire beads. In more particular embodiments, laser ablation is used to selectively remove portions of first and/or second tire beads to improve one or more uniformity characteristics. Although the subject application describes laser ablation as a method for selectively removing tire bead material, it should be appreciated that other removal techniques, such as but not limited to grinding, sandblasting, water jet removal and the like may be employed to implement the precision removal functionality as described herein.

Referring now to FIG. 1, a first step 100 in an exemplary method according to the present disclosure involves identifying parameters of interest for uniformity correction, which parameters may optionally include one or more harmonics of interest. Tire uniformity characteristics may generally include both dimensional or geometric variations (such as radial run out (RRO) and lateral run out (LRO)) as well as rolling force variations (such as radial force variation, lateral force variation and tangential force variation) and even other parameters including but not limited to mass variance, conicity, ply steer and the like.

Additional uniformity parameters that may be corrected include measured and/or estimated/calculated high speed radial force. Estimated high speed radial force may be estimated from a combination of imbalance (mass uneven distribution) and low speed radial force vectors, such as disclosed in U.S. Pat. No. 7,082,816 (Fang Zhu), owned by the present applicant and which is incorporated by reference herein for all purposes.

The present subject matter will focus its discussion on the correction of rolling force variations. Specific examples herein discuss methods of correcting excess levels of radial and/or lateral force variations. It should be appreciated that correction for other particular uniformity characteristics may be possible in accordance with the disclosed techniques. As such, the examples herein should not be unnecessarily limiting to the present invention.

Referring still to FIG. 1, step 100 may also optionally involve identification of which harmonics to correct for each identified parameter of interest. In some embodiments, correction of selected identified harmonics (e.g., $1^{st}$, $2^{nd}$, $3^{rd}$ and/or $4^{th}$ harmonics) may be desired for the parameter(s) of interest. In other embodiments, correction of all harmonics may be desired by considering the complete cyclic, or composite waveform, of the uniformity parameter(s).

The identification of which uniformity characteristics to correct may be determined in part by the results of uniformity testing performed on a manufactured tire. For example, a cured tire may be tested to determine whether the tire has radial and/or lateral force variations (and/or other characteristics) that fall within certain predetermined acceptable ranges for delivering the tire to a customer. If not, it may be possible to correct the uniformity characteristics of a tire in accordance with the disclosed uniformity correction techniques.

For example, considering radial force variation as a specific uniformity characteristic, the composite radial force variation is typically determined by a tire uniformity tester. From a measured composite curve, the radial force variation magnitude may be determined and compared to a respective acceptable threshold limit. If the absolute value of the radial force variation magnitude is less than a respective predetermined minimum threshold magnitude limit, the tire may be deemed acceptable and no further processing of the tire is needed. The tire is then typically shipped to a customer. If the tire has a magnitude for radial force variation greater than the corresponding acceptable minimum threshold magnitude limit, another comparison is performed. If the radial force variation magnitude is greater than a relatively large maximum threshold magnitude limit, the tire is deemed uncorrectable. If the tire is uncorrectable it may be scrapped. If the tire falls within a predetermined range of magnitudes for radial force variation, it is forwarded for uniformity characteristic correction. For example, if the radial force variation magnitude is greater than the acceptable minimum threshold magnitude limit for shipping to a customer but less than the relatively large maximum threshold magnitude limit for scrapping, the tire may be deemed correctable at a uniformity correction station. Preferably, after the tire is corrected in accordance with the subject techniques, it will have performance characteristics within the acceptable threshold limits and can be shipped to a customer.

Referring again to FIG. 1, a second exemplary step in accordance with embodiments of the present technology includes retrieving measured uniformity parameter(s) for a tire to be corrected. Such measured parameters may be retrieved from data storage associated with prior uniformity testing that was conducted on a tire, or may actually be measured at step 102 as a new uniformity measurement. An exemplary measurement machine for measuring tire uniformity characteristics may generally include such features as a mounting fixture on which a tire is mounted and rotated centrifugally at one or more predetermined speeds. In one example, laser sensors are employed to operate by contact, non-contact or near contact positioning relative to the tire in order to determine the relative position of the tire surface at multiple data points (e.g., 128 points) as it rotates about a center line. Average values for such multiple data points may be obtained by averaging the measurements over multiple tire rotations, thus reducing the chance of spurious data point measurements. It should be appreciated that any suitable measurement machine capable of obtaining uniformity measurements, such as but not limited to RRO, LRO, RFV, TFV, LFV, balance and the like may be utilized. One specific example of a tire uniformity tester is available from a supplier such as Micro-Poise Measurement Systems LLC of Akron, Ohio under the Akron Standard brand of products.

The measurement data obtained or provided in step 102 may help determine which uniformity parameter(s) and harmonic(s) to correct as well as which tire bead area(s) to selectively remove in accordance with subsequent correction steps. As such, the measurement data (e.g., a composite waveform of the radial force variation) may be stored in a database or other memory/media device associated with a computer or other processing unit so that the respective measurements can be analyzed in accordance with various steps disclosed herein. An example of a composite waveform as measured by a uniformity measurement machine is provided in FIG. 5A, which plots exemplary radial force variation values (measured in kilograms force—kgf, or simply kg) versus angular position (measured in degrees).

Figure 5A:
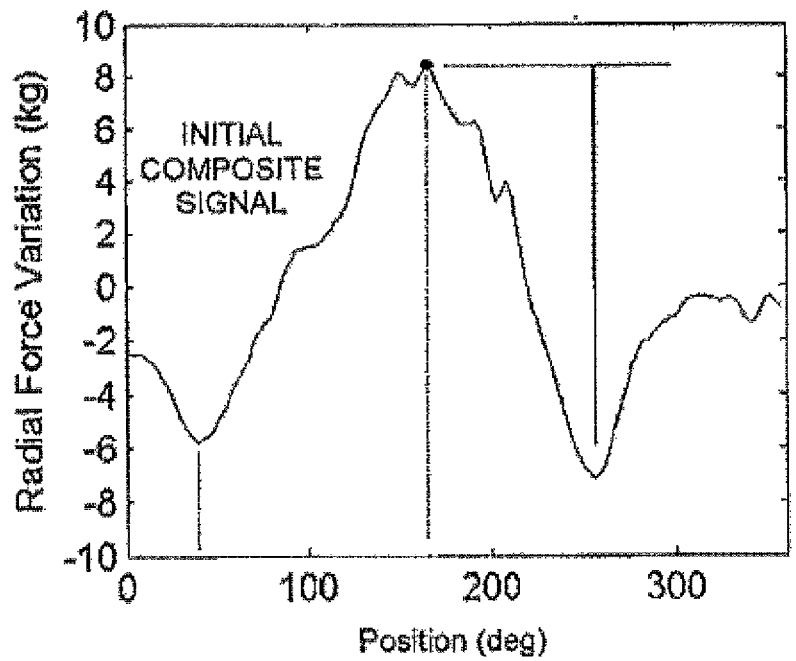
FIG. 5A provides a graphical representation of composite radial force variation of a tested tire as a function of the angular location around the tire.
Figure 5B:
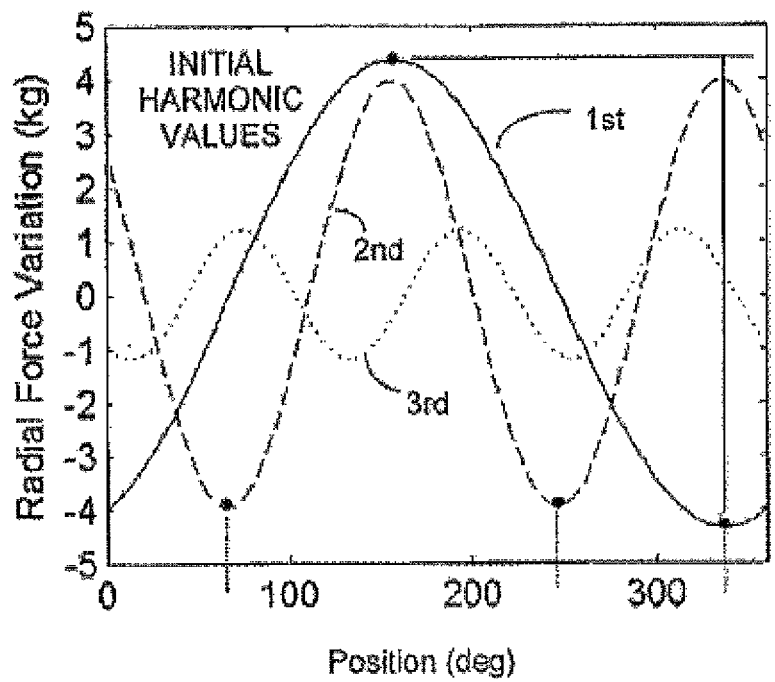
FIG. 5B provides a graphical representation of the initial values of the first through third harmonics of radial force variation of the tested tire as shown in FIG. 5A.

It should be appreciated that composite force variation measurements, such as but not limited to the radial force variation waveform of FIG. 5A, can also be expressed as a sum of its harmonic sinusoidal components. For example, FIG. 5B shows the uncorrected first through third harmonics of radial force variation in kilograms of force variation (kgf) as a function of angular location around the tire from a reference location. The first harmonic component of a composite waveform completes a full cycle in one rotation of a tire (360 degrees). The second harmonic component completes two full cycles in each tire rotation, the third harmonic component completes three full cycles in each tire rotation, and so forth.

The individual harmonics shown in FIG. 5B and others may be obtained by applying Fourier decomposition (e.g., a Discrete Fourier Transformation—DFT or Fast Fourier Transform—FFT) to the measured composite signal. For example, when force measurements are obtained for d=256 data points at equally spaced angular positions around a tire, then 128 or d/2 harmonics can be calculated. The sum of these 128 harmonics will pass through each of the 256 data points.

With a Fourier transformation, the rectangular components of harmonics H1 and above would be calculated as follows:

$$x = \frac{2}{d}\sum_{i=1}^{d} F_i * \cos\left(2\pi h * \left(\frac{i}{d}\right)\right) \text{ and } y = \frac{2}{d}\sum_{i=1}^{d} F_i * \sin\left(2\pi h * \left(\frac{i}{d}\right)\right),$$

where h=harmonic to estimate, d=number of data points, i=$i^{th}$ data point, and $F_i$=force at an $i^{th}$ point. From the rectangular components, the harmonic magnitude (MAG) and azimuth (AZI) would be calculated as:

$$MAG = 2\sqrt{x^2 + y^2} \text{ and } AZI = \arctan(y/x)$$

The magnitude (MAG) corresponds to the peak-to-peak value of a particular harmonic waveform, and the azimuth (AZI) corresponds to the angular location of the first peak in such harmonic waveform. A harmonic waveform for each h harmonic (similar to the first through third harmonics shown in FIG. 3) would be represented by the equation:

$$F = \frac{MAG}{2}\cos\left(2\pi h \frac{i}{d} AZI\right).$$

Once the uniformity parameters of interest are measured, and any harmonics of interest are extracted, a subsequent step in the correction method of FIG. 1 involves establishing one or more correction rules. Correction rules generally correspond to identified parameter values, including values for uniformity correction parameters and ablation parameters. For example, uniformity correction values may define for a particular uniformity parameter a particular limit (such as the acceptable customer threshold limits discussed above) or a fixed amount of correction (e.g., to within a new threshold level of force magnitude).

In another example, a correction rule corresponds to identifying one or more track(s) or area(s) along each tire bead as a desired ablation location. Sensitivity levels (e.g., in kg/mm and/or various weightings by track, parameter and/or harmonic may also be established. Exemplary methods for determining sensitivity levels may involve determining how much change in force will result from implementing an ablation pattern to correct for a single specific parameter and harmonic at a set maximum depth of ablation. For example, an ablation pattern having a 1 mm maximum depth is ablated in accordance with a pattern to correct for first harmonic radial force, and a change in force based on this correction is determined. This change in force (in kg) corresponds to the sensitivity level in kg/mm. With regard to the chosen location(s) of ablation and corresponding importance weightings, it should be appreciated that some embodiments of the present invention may provide for multiple ablation locations, each potentially having a respectively established sensitivity level, as will be better appreciated with reference to FIGS. 4 through 6.

Figure 4:
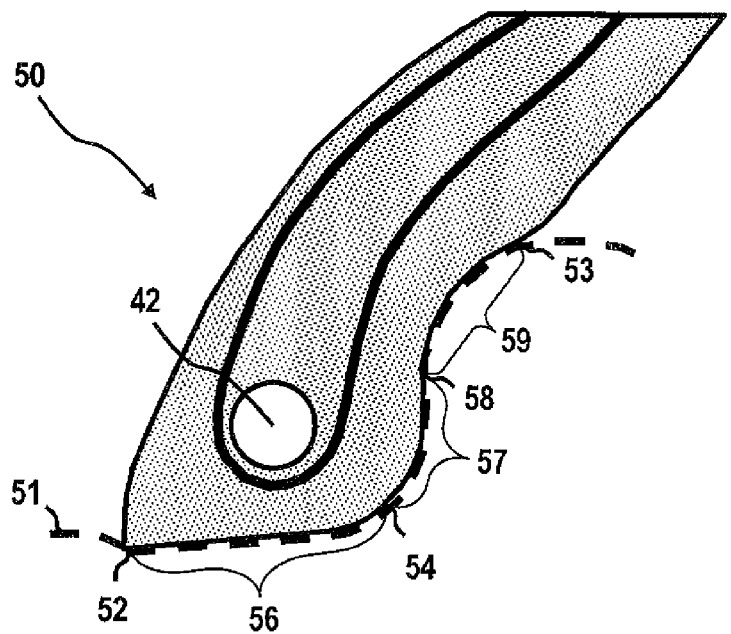
FIG. 4 provides a graphical representation of vertical and horizontal reference positions along a tire bead profile for determining tracks or areas for selective removal in accordance with exemplary embodiments of the present invention.

FIG. 4 provides a magnified cross-sectional view of a tire bead, generally showing the various portions of such tire portion relative to its seated location on a wheel rim. For example, each tire bead area 50 includes a tire bead 42 and its surrounding rubber portions that are configured to define a bead profile as shown in FIG. 4. In general, the profile portion of the tire bead between toe 52 and an exit point 53 is fitted against a portion of a wheel rim for secure mounting thereto. Dotted line 51 represents an exemplary portion of a wheel rim against which tire bead area 50 may be secured for mounting. The bottom surface of the bead profile generally defined between toe 52 and heel 54 is referred to herein as the bead seat 56. The profile portion between heel 54 and exit point 53 is referred to generally as the flange, and includes a lower flange portion 57 between the heel and a flange transition point 58 and an upper flange portion 59 between the flange transition point 58 and the exit point 53.

With reference to the bead profile areas of FIG. 4, it should be appreciated that one or more track(s) or area(s) of ablation may be specified in accordance with the ablation techniques of the present specification. For example, tests have been specifically performed to analyze the overall effects on certain uniformity characteristics based on removal tracks implemented in the three different seat 56, lower flange 57 and upper flange 59 zones of a bead profile. In one example, a differential change in peak-to-peak magnitude of first harmonic radial force ranged from about 2.5-5.0 N/mm when bead correction was directed to the seat zones of a pair of tire beads. A similar differential change of about 1.0-4.2 was achieved when bead correction was directed to the low flange zones of a pair of tire beads. A differential change of about 2.5-7.5 was achieved when bead correction was directed to the high flange zones of a pair of tire beads. Such changes were achieved with laser ablation performed at single track locations, with each ablation area no greater than about 0.5 mm deep and over a range of about 180 total degrees. Such testing was also confirmed to maintain proper levels of bead seating force, with inflation levels found to be only nominally reduced by a range of no more than about 0.2-1.8 bars. Such levels are generally found not to elevate tire wear on the rim or generally harm the preferred rotation of a tire on the rim.

According to the above studies, various combinations of track or area removal may be employed to correct one or more harmonics of one or more uniformity characteristics. In one exemplary embodiment, laser ablation correction is applied to just the seat zone, just the low flange zone, or just the high flange zone. In another exemplary embodiment, correction is applied to equally assigned or specifically weighted combinations of two or more of such zones (e.g., application of ½ correction in the seat zone and ½ correction in the upper flange zone; or ⅓ correction in the seat zone, ⅓ correction in the lower flange zone, ⅓ correction in the upper flange zone). Any number of different selectable options may be employed for track/area selection. It should be appreciated that when ablation is distributed over different tracks/areas of a tire bead, it is possible to achieve greater reduction in uniformity levels without having to remove as much rubber material, thus decreasing the chances of jeopardizing correct bead seating (and corresponding levels of tire pressure and Bead Seating Force (BSF)).

Referring again to FIG. 4, one exemplary embodiment of ablation in the bead seat zone 56 is directed to the portion of the bead seat 56 directly below the bead wire 42, which may generally correspond to an area about midway between the toe 52 and heel 54. An exemplary embodiment of ablation in the low flange zone 57 is directed to a portion of the lower bead flange 57 axially adjacent to the bead wire 42, which may generally correspond to an area about midway between heel 54 and transition point 58. An exemplary embodiment of ablation in the high flange zone 59 is directed to a portion of the upper bead flange about midway between transition point 58 and exit point 53. Such exemplary embodiments may correspond to portions of such respective areas at which ablation will cause a more significant change in resultant uniformity correction.

Once various correction rules, including optionally specified values for uniformity correction and/or ablation parameters, have been established in step 104 of the FIG. 1 method, an ablation pattern can be calculated in step 106. Ablation patterns should generally include an ablation depth relative to the angular location and/or bead location around a tire, and may be determined for each identified tracks/areas for correction. A single pattern may define ablation depth across a comprehensive area, or multiple patterns may define ablation depth for multiple specific tracks. As previously mentioned, one or more maximum ablation depths may also be specified for limiting the amount of material for selective removal from tire bead locations.

Referring still to FIG. 1, once the ablation pattern has been calculated in step 106, selective removal of tire material at the one or more specified tracks/areas is accomplished in accordance with the calculated patterns at step 108. In one exemplary embodiment, laser ablation is employed as a preferred removal technique because it is able to accomplish removal depths and areas with precise control. To the extent that other rubber removal techniques, such as but not limited to grinding, sandblasting, water jet removal and the like may be implemented to achieve the same precision levels as laser ablation, the present subject matter may also employ such alternative removal techniques.

Figure 2:
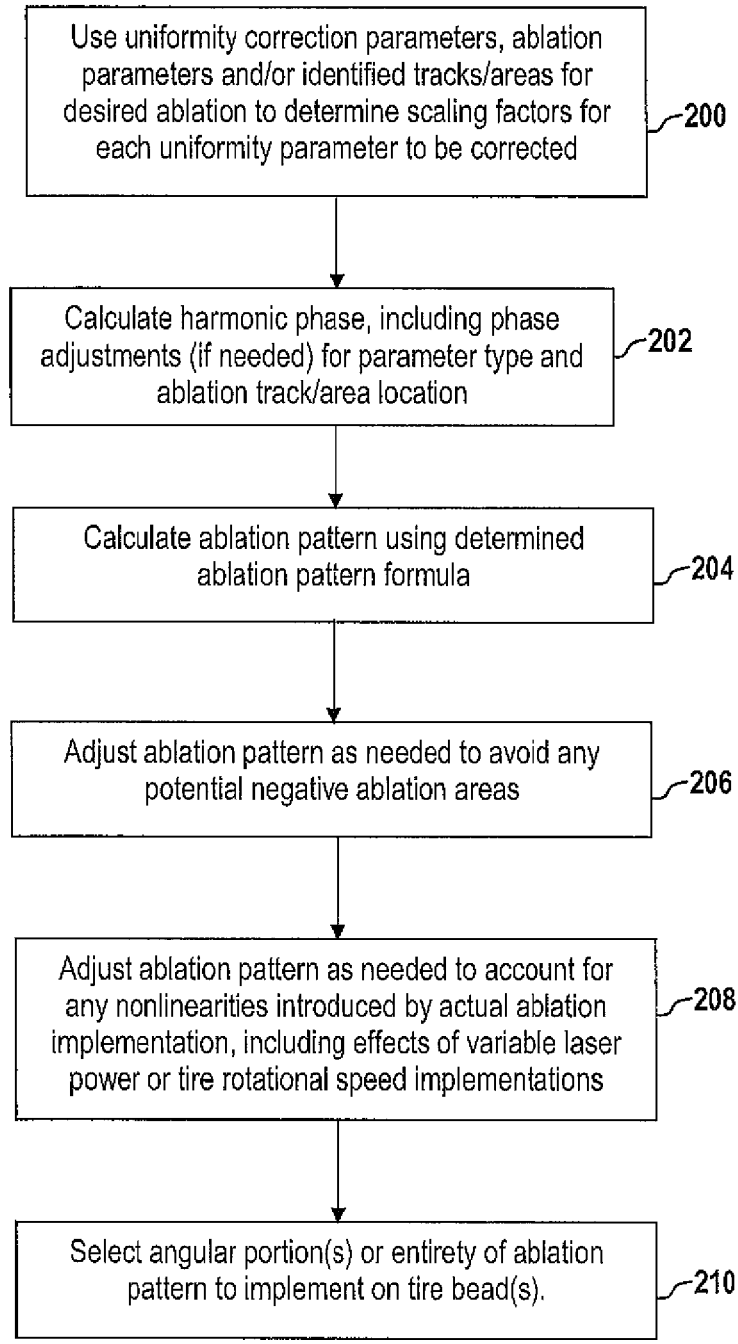
FIG. 2 provides a flow chart of exemplary steps and features in a more particular method for calculating ablation patterns for selective removal along one or more tire bead locations in accordance with aspects of the present invention.

More particular details concerning a method for calculating ablation patterns for a tire are illustrated in FIG. 2. A first exemplary step 200 involves using uniformity correction parameters, ablation parameters, and/or identified tracks/areas for ablation to determine scaling factors $AMP_k$ for each uniformity parameter k to be corrected. For example, when uniformity parameters to be corrected correspond to radial force and/or lateral force variations, amplitude scaling factors $AMP_{VR}$ and $AMP_{VL}$, may be determined for radial and lateral force variations at one or more different ablation tracks along specific locations within the bead seat, low flange and/or high flange zones. Scaling factors are generally intended to account for the different weightings described above (e.g, equal weight between 2 or 3 or more selected tracks) and among different parameters. In one particular example, the amplitude scaling factors $AMP_{VR}$ and $AMP_{VL}$ may be calculated by the following formulas:

$$Amp_{VR} = \frac{Goal_{VR} \cdot VR_{Weight\ by\ track}}{VRscale}$$

$$Amp_{VL} = \frac{Goal_{VL} \cdot VL_{Weight\ by\ track}}{VLscale}.$$

In the scaling factor formulas above, $VR_{Weightbytrack}$ and $VL_{Weightbytrack}$ correspond to the respective weightings for each track. In one example, such weights may be as simple as either a zero or one value depending on whether or not ablation correction is desired for that parameter and/or track location. In other examples, specific proportions of weights may be used to indicate a higher preference towards uniformity correction at one track(s) versus other track(s). An example of the weights for VR and VL using three different tracks (flange, low seat and high seat) is shown in Table 1 below. If no low flange ablation is desired, then the column under Track 2 could contain zero (0) values. Similar changes to accommodate other selections are possible by simple changing of the weight values per track and parameter.

TABLE 1

Exemplary weightings for combinations of parameter and ablation track

|  | Track 1 - Seat | Track 2 - Low Flange | Track 3 - High Flange |
|---|---|---|---|
| VR Weight | 1 | 1 | 1 |
| VL Weight | 1 | 1 | 1 |

In the above scaling factor formulas, the values for $Goal_{VR}$ and $Goal_{VL}$ correspond to the desired amount of total correction for a particular uniformity parameter, for example as determined in a quantity such as but not limited to kilograms force (kgf, or simply kg). One exemplary range of correctable force limits may be chosen from between about 1-10 kgf. It should be appreciated that when ablation patterns are determined for both left and right tire beads, the values for $Goal_{VR}$ and $Goal_{VL}$ may be set such that each bead achieves half of the overall goal.

Still further, it should be appreciated that the quantities VRscale and VLscale in the above scaling factor formulas correspond to quantities that account for total amounts of track weighting and sensitivity levels per the formulas below. Sensitivity weightings per track identify a determined sensitivity level (e.g., in kg/mm) that exists when correction is applied to such particular locations. Specifics about how to determine appropriate sensitivity levels will be presented in the example which follows later in this disclosure.

$$VRscale = \sum_{Tracks} VR_{Sensitivity\ by\ track} \cdot VR_{Weight\ by\ track}$$

$$VLscale = \sum_{Tracks} VL_{Sensitivity\ by\ track} \cdot VL_{Weight\ by\ track}$$

Once scaling factors have been determined in step 200 of FIG. 2, a second step 202 involves calculation of a harmonic phase, which identifies phase adjustment (if needed) for particular parameter types and ablation track locations. Harmonic phase ($\phi_h$) is generally determined for each harmonic of interest by the following formula:

$$\phi_h = Azimuth_h * h,$$

Where h is the harmonic number and $Azimuth_h$ is the angle where the first peak of the harmonic waveform for harmonic h occurs.

Adjustments can be made to the harmonic phase calculations to account for certain conditions. One adjustment condition for the harmonic phase calculation corresponds to correction in the low flange area. It has been determined that low flange correction adjusts uniformity parameters in a manner that is 180 degrees out of phase with uniformity correction in other locations, such as the seat and high flange zones. As such, if an ablation pattern is determined for a track in the low flange area, then the harmonic phase is adjusted as $\phi_h \phi_h + 180°$.

Another adjustment condition for the harmonic phase calculation corresponds to the correction of lateral force variation. It has been determined that the portion of an ablation pattern correcting for lateral force variations should not be the same for both first and second tire beads (as it usually is for correction of radial force variation components of an ablation pattern). Instead, the portion of an ablation pattern correcting for lateral force variations in first and second tire beads should be 180 degrees out of phase with one another. As such, if an ablation pattern is determined for first and second tire beads ("bead1" and "bead2"), and the harmonic phase is determined for correction of lateral force, then the harmonic phase for one of bead1 and bead2 is adjusted as $\phi_h = \phi_h + 180°$.

A general depiction of exemplary differences between ablation locations for different types of harmonics and force variations is shown in FIGS. 11A-12C.

FIGS. 11A-11C collectively illustrate one example of an ablation pattern location correcting for first harmonic radial force. FIG. 11A shows a perspective view of ablation locations on a tire, while FIGS. 11B and 11C graphically depict such locations plotted as ablation depth versus angular position around the tire, for first and second beads, respectively. As shown, ablation patterns for first and second tire beads are substantially the same when correcting for radial force.

FIGS. 12A-12C collectively illustrate one example of an ablation pattern location correcting for first harmonic lateral force. FIG. 12A shows a perspective view of ablation locations on a tire, while FIGS. 12B and 12C graphically depict such locations plotted as ablation depth versus angular position around the tire, for first and second beads, respectively. As shown, ablation patterns for first and second tire beads are 180 degrees out of phase when correcting for lateral force.

Referring again to FIG. 2, another step in the process of determining ablation patterns is to plot an ablation pattern for each tire bead and for each of the one or more ablation tracks in each bead. In one example of how to determine such ablation patterns, the following formula is instructive:

$$\text{Ablation}(\theta) = \sum_h Amp_k * \text{Cos}(\theta \cdot h + \varphi_h),$$

where Ablation($\theta$)=ablated depth at angular position $\theta$ around a tire bead, $Amp_k$=weighted correction amplitude for parameter k, h=Harmonic number and $\phi_h$ is the phase of harmonic h for parameter k. When an ablation pattern is determined to correct for a limited number of harmonics, the above formula is determined as a sum of those selected harmonic values (h=1, 2, 3, etc.) When an ablation pattern is determined to correct for the complete cyclic, the above formula is determined as a sum of all harmonics from h=1, 2, ..., d/2 for d total points at which a uniformity parameter is measured around a tire. An example of an ablation pattern that corrects for both lateral and radial force variations can be expressed as follows:

$$\text{Ablation}(\theta) = \sum_h Amp_{VR} * \text{Cos}(\theta \cdot h + \varphi 1_h) + \sum_h Amp_{VL} * \text{Cos}(\theta \cdot h + \varphi 2_h),$$

where scaling factors $AMP_{VR}$ and $AMP_{VL}$ are as described above, and where the harmonic phase $\phi 2_h$ is adjusted by 180 degrees for one of two tire beads if the ablation formula is correcting for lateral force variation.

Referring still to FIG. 2, additional steps 206 and 208 involve optional adjustments that may be made to the determined ablation pattern that may assist with the actual implementation. For example, step 206 involves adjusting the ablation pattern(s) determined in step 204 to avoid any potential negative ablation areas. This can be done by shifting the ablation pattern such that the minimum value(s) of the ablation pattern occur(s) at an ablation depth of about zero. Step 208 involves adjusting the ablation pattern as needed to account for any nonlinearities introduced by actual ablation implementation. Such step may involve applying a mapping function that correlates programmed ablation depths to actual ablation depths to accommodate variable laser power and/or tire rotational speed implementation of an ablation pattern. For example, different ablation patterns may be programmed as input to ablation hardware depending on whether variable speed or variable power is preferred. Still further a determination of the tire rotational speed can be determined as a function of the angular location around a tire to implement a desired ablation pattern.

A final step 210 illustrated in FIG. 2 that may be performed before actual removal of tire material in accordance with determined ablation patterns involves the selection of angular portion(s) of an ablation pattern to implement on a tire bead. In some embodiments, ablation patterns are determined and implemented over the entire 360° expanse of first and second tire beads. In other examples, only identified portions that are less than the entire 360° expanse of the bead are ablated. For example, it may be desirable to save time and cost by limiting the ablation areas to only those where uniformity correction is most needed. This may be particularly advantageous when uniformity correction is focused on only a limited number of harmonics. For example, one exemplary implementation of second harmonic radial force variation correction employs opposing ablation areas of 80 to 180 degrees duration, which are the same for both beads. One exemplary implementation of first harmonic lateral force variation correction employs 150 to 360 degree ablation patterns which are 180 degrees out of phase for the two beads.

Figure 6:
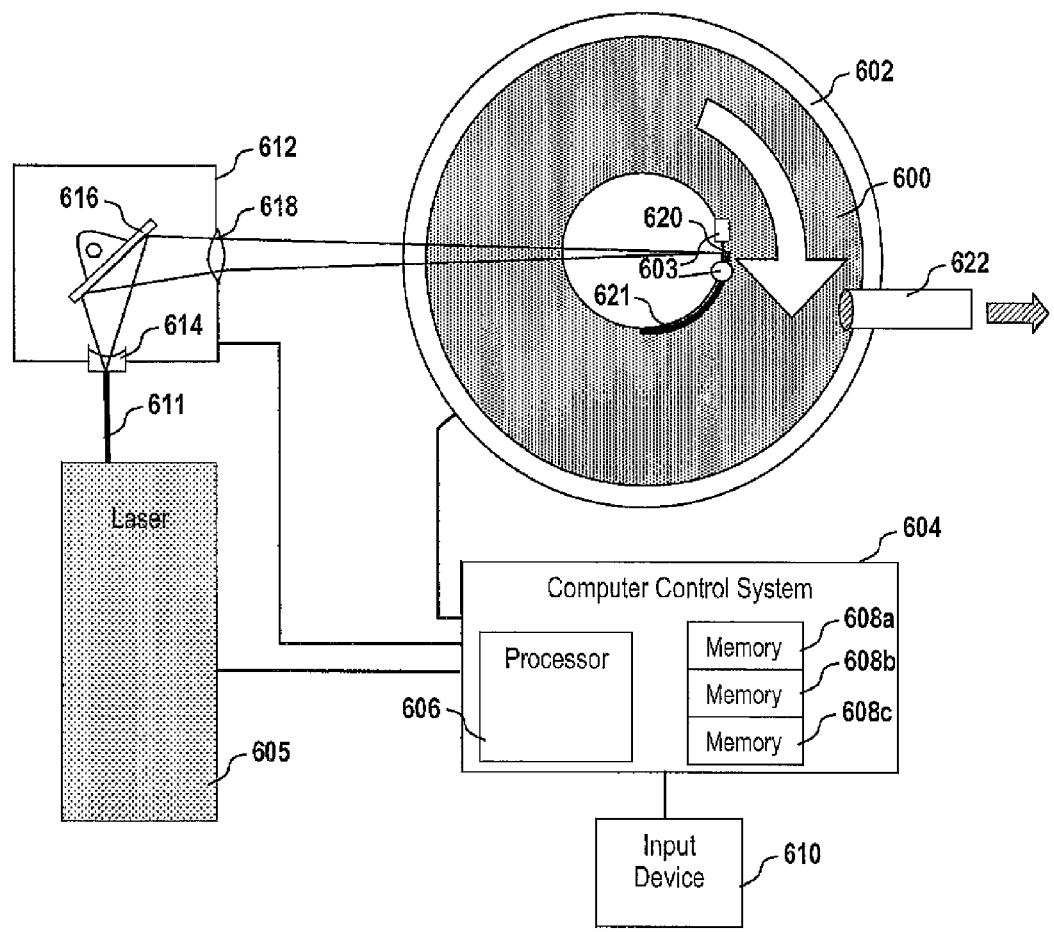
FIG. 6 is a block diagram of exemplary hardware components in a uniformity correction machine employing laser ablation in accordance with aspects of the present invention.
Figure 7:
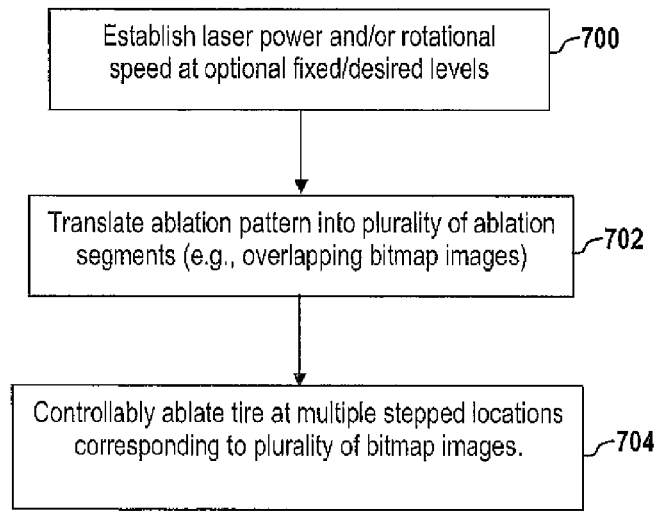
FIG. 7 provides a flow chart of exemplary steps and features in an exemplary method for performing laser ablation in accordance with aspects of the present invention.

Referring now to hardware features for accomplishing uniformity correction measures, FIG. 6 illustrates an exemplary block diagram of hardware components that may be utilized in an apparatus for accomplishing the subject laser ablation. A tire 600 is securely mounted to a rotatable tire rotator 602, which may generally include a mounting fixture which serves as a hub having similar qualities to a tire rim or other rigid disk configured to rotate centrifugally about a center line. One or more rollers 603 may be provided to control the rotational positioning of tire 600 in a way that offers precision control with simultaneous exposure to the entire angular span of one or both tire beads. Such a mounting arrangement facilitates implementation of full 360° ablation patterns, when desired.

The speed of rotation of tire rotator 602 is controllable by a computer control system 604. Computer control system 604 may be configured to control not only the tire rotator, but also the specifics of a laser 605, including but not limited to the variable ablation pattern, laser power level, and the like.

Computer control system 604 may generally include such components as at least one memory/media element or database for storing data and software instructions as well as at least one processor. In the particular example of FIG. 6, a processor(s) 606 and associated memory/media elements 608a, 608b and 608c are configured to perform a variety of computer-implemented functions (i.e., software-based data services). At least one memory/media element (e.g., element 608b in FIG. 6) is dedicated to storing software and/or firmware in the form of computer-readable and executable instructions that will be implemented by the one or more processor(s) 606. Other memory/media elements (e.g., memory/media elements 608a, 608c) are used to store data which will also be accessible by the processor(s) 606 and which will be acted on per the software instructions stored in memory/media element 606b. The various memory/media elements of FIG. 6 may be provided as a single or multiple portions of one or more varieties of computer-readable media, such as but not limited to any combination of volatile memory (e.g., random access memory (RAM, such as DRAM, SRAM, etc.) and nonvolatile memory (e.g., ROM, flash, hard drives, magnetic tapes, CD-ROM, DVD-ROM, etc.) or any other memory devices including diskettes, drives, other magnetic-based storage media, optical storage media and others. Although FIG. 6 shows three separate memory/media elements 608a, 608b and 608c, the content dedicated to such devices may actually be stored in one memory/media element or in multiple elements, Any such possible variations and other variations of data storage will be appreciated by one of ordinary skill in the art.

In one particular embodiment of the present subject matter, a first portion of memory/media 608a is configured to store input data for the subject uniformity correction system and related methods. Input data stored in memory/media element 608a may include raw data measured for one or more uniformity parameters per step 102. Input data stored in element 608a may also include correction parameters selectable by a user, such as but not limited to the k parameters for correction, the number of harmonics h for each parameter to correct, the number and location of the track(s)/area(s) for desired ablation, desired magnitude limits on the uniformity parameters of interest, limits on the ablation depth, other tire size and component location data, and the like. Such predetermined parameters may be pre-programmed into memory/media element 608a or provided for storage therein when entered as input data from a user accessing the input device 610, which may correspond to one or more peripheral devices configured to operate as a user interface with computer control system 604. Exemplary input devices may include but are not limited to a keyboard, touch-screen monitor, microphone, mouse and the like.

Second memory element 608b includes computer-executable software instructions that can be read and executed by processor(s) 606 to act on the input data stored in memory/media element 608a to create new output data (e.g., control signals for defining an ablation pattern, laser power, tire rotational speed, etc.) for storage in a third memory/media element 608c. Such output data may be provided as control signals to the rotating tire fixture 602, laser 605, laser beam deflector 612, and other optional components. Computer control system 606 may be adapted to operate as a special-purpose machine by executing the software instructions rendered in a computer-readable form stored in memory/media element 608b. When software is used, any suitable programming, scripting, or other type of language or combinations of languages may be used to implement the teachings contained herein. In other embodiments, the methods disclosed herein may alternatively be implemented by hard-wired logic or other circuitry, including, but not limited to application-specific circuits.

Referring more particularly to the laser components of FIG. 6, laser 605 may be a fixed-point or sheet-of-light laser system that outputs a laser beam 611 having a sufficient amount of power to perform selective removal of tire rubber material. In one particular example, laser 605 is a carbon dioxide ($CO_2$) laser. After output by laser 605, laser beam 611 may be provided to a laser deflection element 612, which include such elements as a beam splitter 614, deflector 616 and imaging lens 618. Imaging lens 618 focuses the laser beam's illumination to a focal point 620 on tire 600 to remove rubber in an ablated area 621 along a tire bead. The distance between laser deflector 612 and tire 600 may be known or sensed by one or more distance sensors.

The system of FIG. 6 is intended to illustrate laser ablation using a single laser and single focal point (i.e., removal at one tire bead at a time). However, it should be appreciated that multiple lasers and tire rotators can be used to perform ablation at multiple focal points (e.g., at both tire beads). Such variations to the subject laser removal systems are held to be within the purview of one of ordinary skill in the art. A vacuum 622 or other cleaning tool may be provided to extract any removed rubber or other waste from the ablation area. Additional outlets may provide a controlled output of gaseous medium (e.g., a nitrogen gas) to facilitate laser ablation and suppress potential flames at the ablation point.

Specific algorithms for optimizing the efficiency of the laser-based system depicted in FIG. 6 may be practiced in accordance with some embodiments of the presently disclosed technology. For example, since many of the ablation patterns that will be implemented by the laser follow a sinusoidal pattern, the varied ablation depths may be implemented in a variety of different manners. In one example, computer control system 604 is programmed to rotate tire 600 on tire fixture 602 at a fixed speed while varying the power of the laser to accomplish the increasing and then decreasing laser ablation depth along a generally sinusoidal ablation pattern. In another example, computer control system 604 is programmed to operate laser 605 at its maximum power level (or at some other fixed power level) and then vary the rotational speed of the tire fixture 602. By varying the circumferential speed of the laser, while keeping the laser at a fixed power level, the depth of the ablation can be varied in a harmonic manner over a specified range of angular positions. Advantages of such a method, especially when the laser power is kept at a higher or highest power level, include optimization of energy density of the laser system and resulting ablation efficiency. Reduced correction time by maximizing laser energy density can optimize speed of the correction process and the resultant number of tires that can be corrected in a given amount of time. In one example, the laser power is kept at within a range of between about 200-1500 Watts.

More particular examples of steps that may be implemented as part of the laser-based ablation techniques of the present invention are presented in FIGS. 7-10, respectively. Referring now to such figures, a first step 700 in a method for performing laser ablation involves establishing any desired fixed levels of either laser power or tire rotational speed. For example, in one embodiment laser power is fixed at a maximum while leaving the laser's rotational speed variable to accomplish ablation patterns of varying depths. Another step 702 involves translating the determined laser ablation patterns into a plurality of ablation segments. Ablation segments generally represent small portions of the total ablation pattern that will be removed in incremental fashion by the laser removal system.

Figure 8:
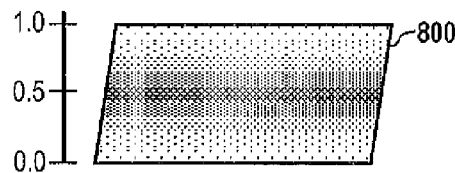
FIG. 8 illustrates an exemplary ablation segment in the form of a grayscale bitmap image.

In one particular example, each ablation segment determined in step 702 is defined as a bitmap image which correlates the ablation depth along each track to a varied-tone graphic image (e.g., having color or grayscale variations) representative of such depths. Such varied-tone images can then be interpreted by software control of the laser to produce the desired ablation depths and resultant patterns. More particularly, at step 704 the tire is controllably ablated at stepped locations corresponding to the plurality of bitmap images. FIG. 8 shows an exemplary ablation segment 800 in the form of a grayscale bitmap image for a particular segment of laser ablation that may be performed by a laser in accordance with some particular embodiments of the present invention. In such ablation segment, the lower dot density representative of lighter grayscale tones correspond to smaller ablation depths and higher dot density representative of darker grayscale tones correspond to larger ablation depths.

Figure 9:
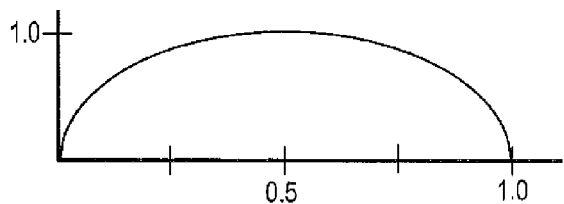
FIG. 9 provides a graphical illustration of ablation depth represented by the grayscale image of FIG. 8.

FIG. 9 provides a graphical example of the ablation depths represented by the dotted/grayscale image of FIG. 8. Assume, for example, that the highest dot density representing a darkest grayscale tone shown in FIG. 8 corresponds to an ablation depth of 1 mm, such that the darkest portion of the image occurs around the middle of the vertical range from top to bottom of the bitmap image. The corresponding graph in FIG. 9 plots the vertical position of the bitmap image along the abscissa and the ablation depth (e.g., in mm) along the ordinate. As shown, the variation in ablation depth follows a generally smooth transitional curve as opposed to sharp contrasting regions.

Having a curved (almost sinusoidal) path for the ablation depth may be advantageous by providing smooth edge profiles in the ablation area. Elimination of sharp edges in the ablation patterns makes for a smoother, more undetectable (thus visually appealing) uniformity correction. It also reduces possible changes to the bead seating force and tire pressure levels when the tire beads are subsequently mounted to a rim. Further reduction to any potential parasitic changes to other uniformity parameters may also be achieved in part by smooth profiles and overall limited ablation depths.

Figure 10:
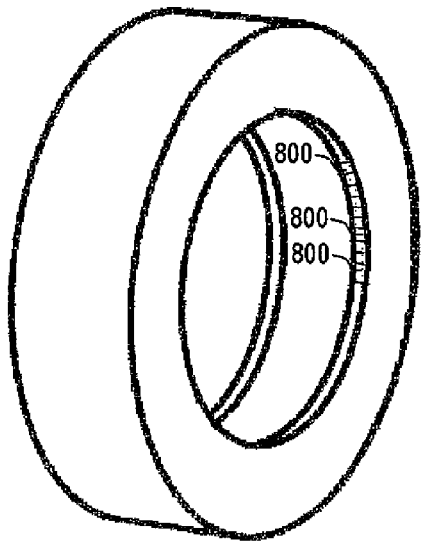
FIG. 10 provides a perspective view of multiple ablation segments removed along a tire bead.

FIG. 10 generally illustrates how multiple ablation segments 800 may be transposed along a bead surface. Although only a single row of ablation segments is illustrated along a tire bead, it should be appreciated that multiple rows and columns of such ablation patterns may exist. Such groupings of ablation patterns may also be correlated to more than one track/area along a tire bead. For example, one set of ablation segments may be translated from an ablation pattern along a tire bead seat zone, while another set of ablation segments may be translated from an ablation pattern along a tire bead flange zone. The varied speed at which a tire is rotated (or varied power at which a laser is operated) can then be used to control the manner of overlap of adjacent ablation segments to achieve the ablation pattern as defined in the above equations. For example, deeper ablation depths along an axial location of a tire bead may be accomplished by laser removal of ablation segments with a substantial amount of overlap from one to the next.

EXAMPLE

To better appreciate aspects of the above-described system and method of uniformity correction by bead ablation, an example of multi-harmonic, multi-parameter correction is provided. In the following discussion, as well as the exemplary data shown in FIGS. 13-21, results are shown that compare initial uniformity parameters to corrected ones after the implementation of determined ablation patterns on first and second tire bead locations. The results below provide simulated data (i.e., test results for hypothetical tires), but exemplify the types of improvements in uniformity achieved from applying the subject analysis to actual manufactured tires. The same type of input data available from the following example would be available for actual manufactured tires, and the same ablation pattern determination techniques would be employed.

Consider a hypothetical test tire having non-uniformity contributions from radial force variation (VR) and lateral force variation (VL). It is established that uniformity correction techniques are desired to correct the first through fourth ($1^{st}$-$4^{th}$) harmonics of radial force variation and the first ($1^{st}$) harmonic of lateral force variation. The initial (measured) values of these exemplary harmonic components for the test tire are indicated in the Table 2 below. Each harmonic is identified in terms of an amplitude (provided in kgf or kg) and azimuth (provided in degrees), where the amplitude corresponds to the peak-to-peak value of the harmonic waveform for that component, and the azimuth corresponds to the angular location of the first peak in such harmonic waveform.

TABLE 2

Initial Uniformity Parameters for Example
Initial Uniformity Parameters

| Parameter | Harmonic | Amplitude | Azimuth |
|---|---|---|---|
| VR | 1 | 7 | −16 |
| VR | 2 | 5 | −69 |
| VR | 3 | 3 | −31.667 |
| VR | 4 | 2 | 9.75 |
| VL | 1 | 6 | 0 |

Figure 13:
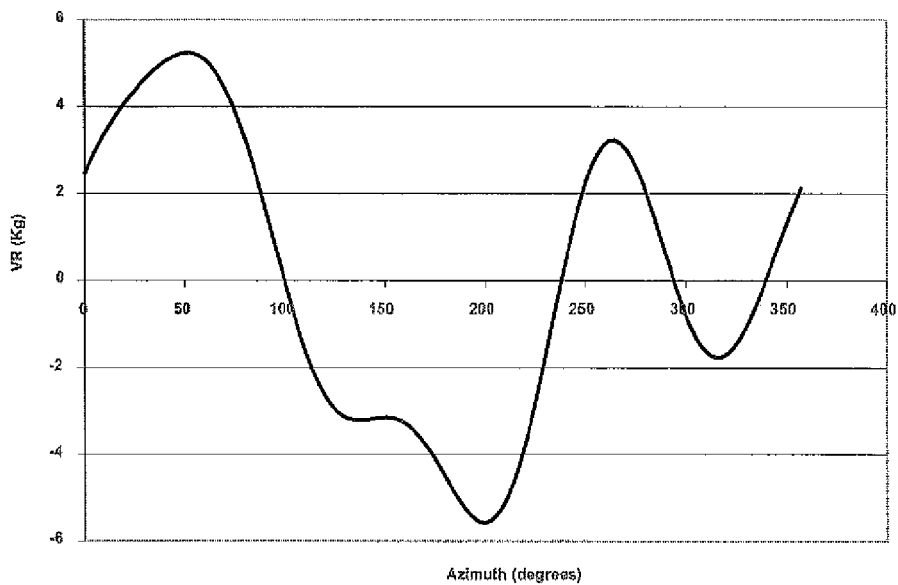
FIG. 13 provides a graphical illustration of a simulated composite waveform including first, second, third and fourth exemplary harmonic components of radial force variation.
Figure 14:
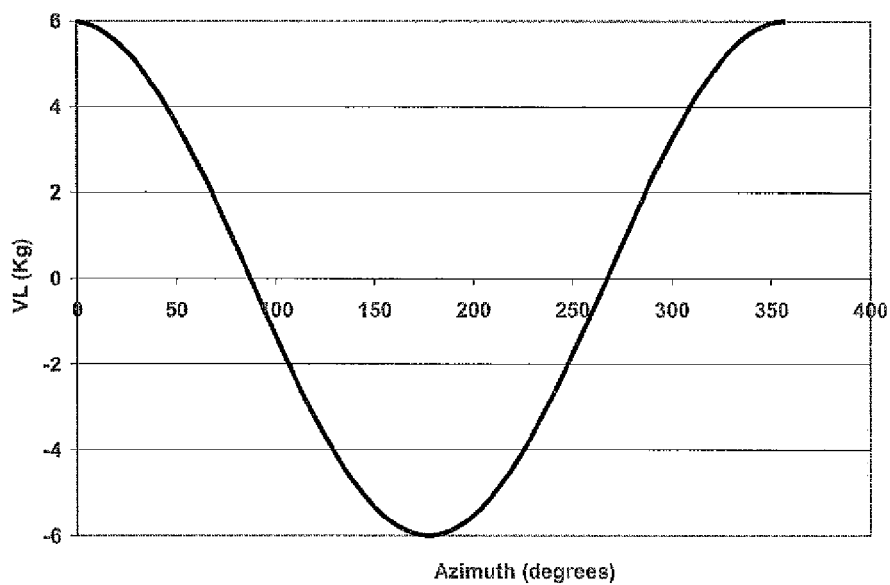
FIG. 14 provides a graphical illustration of a simulated composite waveform including a first harmonic component of lateral force variation.

FIGS. 13 and 14 graphically represent initial measurements of the radial and lateral force variations, respectively. FIG. 13 provides a plot of the initial radial force measured in kgf along the ordinate versus the azimuth in degrees along the abscissa for a composite waveform including the sum the first through fourth ($1^{st}$-$4^{th}$) harmonic components of radial force variation. FIG. 14 provides a plot of the initial lateral force measured in kgf along the ordinate versus the azimuth in degrees along the abscissa for the first ($1^{st}$) harmonic component of lateral force variation.

For each parameter and harmonic of interest, and for each track location for ablation, exemplary correction parameters such as a desired force limit and sensitivity level may be provided. In this case, such correction parameters are determined for correction at a single track location (e.g., ablation in just the high flange zone) for both first and second tire beads and for five combinations of harmonics and parameters (VRH1, VRH2, VRH3, VRH4 and VLH1). Exemplary desired limits (total kgf) for the magnitude of each parameter and harmonic of interest is defined, for example per Table 3 below. In addition, although not shown in the table, a sensitivity level (in kg/mm) may also be defined for each parameter and harmonic of interest.

Exemplary methods for determining sensitivity levels may involve determining how much change in force will result from implementing an ablation pattern to correct for a single specific parameter and harmonic at a fixed maximum depth of ablation. For example, to determine the sensitivity level for first harmonic radial force (VRH1), an ablation pattern having a sinusoidal variation in accordance with the first harmonic and defined for a maximum depth of 1 mm is ablated in accordance with the generally sinusoidal ablation pattern. The change in force based on this correction is determined. This change in force (in kg) corresponds to the sensitivity level in kg/mm. Likewise, to determine the sensitivity level for VRH2, a second harmonic sinusoid with 1 mm maximum depth is ablated into each of first and second tire beads and change in force is measured. This process can be repeated for each combination of parameters and harmonics of interest and each track location for ablation within the various zones of a tire bead.

TABLE 3

Uniformity Correction Parameters for each
parameter and harmonic of interest
Uniformity Correction Parameters

| Parameter | Harmonic | Limit (kg) |
|---|---|---|
| VR | 1 | 4 |
| VR | 2 | 3 |
| VR | 3 | 2 |

TABLE 3-continued

Uniformity Correction Parameters for each
parameter and harmonic of interest
Uniformity Correction Parameters

| Parameter | Harmonic | Limit (kg) |
|---|---|---|
| VR | 4 | 1 |
| VL | 1 | 4 |

Details are now presented for two different solutions, a first of which corrects all harmonics of radial force ($1^{st}$ through $4^{th}$), thus representing a multi-harmonic correction procedure. A second solution corrects for the same radial force harmonics as well as the first harmonic lateral force, thus representing a multi-parameter correction procedure.

Figure 15:
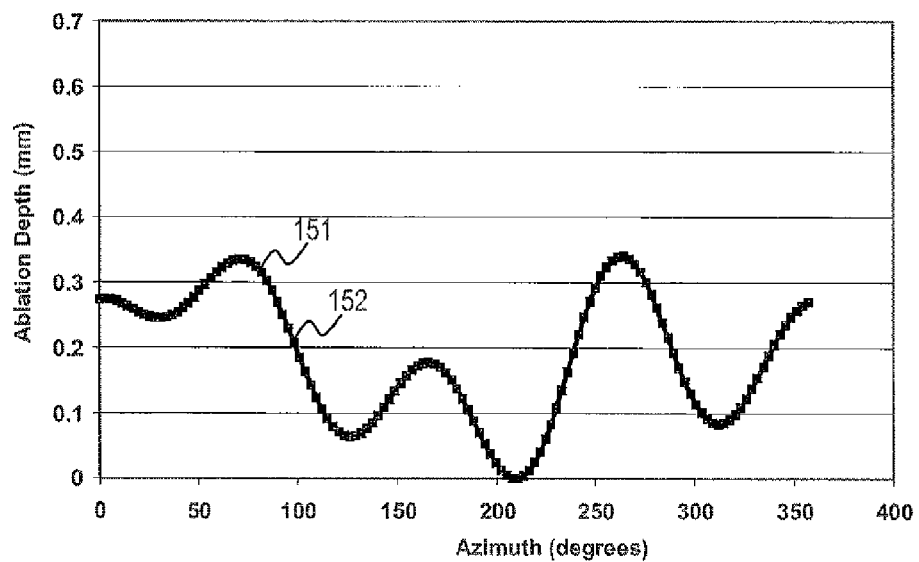
FIG. 15 provides a graphical illustration of calculated ablation patterns for first and second tire beads in order to correct for radial force variation, such as simulated by sum of the first through fourth harmonic components of radial force variation as shown in FIG. 13.

For a multi-harmonic correction of radial force variation only, an ablation pattern modeling the desired correction scheme, and as may be calculated in accordance with the formulas disclosed herein is shown in FIG. 15. Ablation patterns are shown for both first and second tire beads, corresponding to waveforms 151 and 152, with both patterns being substantially the same and in phase with one another. This is because there is no out of phase component due to correction of lateral force variation, low seat flange ablation, or other such conditions in which ablation patterns may vary between the first and second tire beads.

Figure 16:
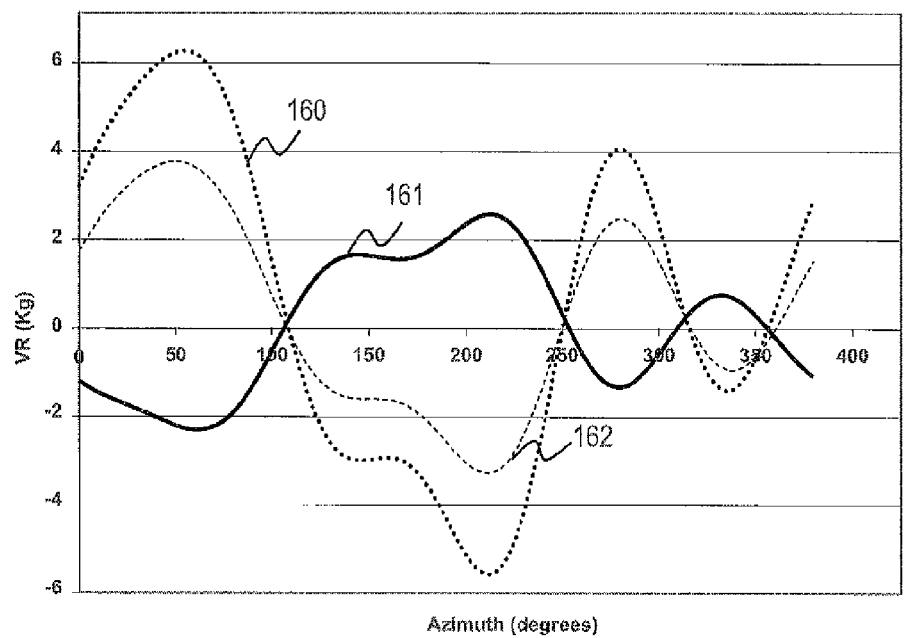
FIG. 16 provides a graphical illustration of simulated values for initial radial force compared to corrected radial force after implementing the ablation patterns of FIG. 15.

FIG. 16 displays the improvement in radial force variation that may be achieved by implementing an actual ablation pattern as shown in FIG. 15. The initial waveform 160 represented in dotted line format shows a composite waveform of initial radial force for the $1^{st}$-$4^{th}$ harmonics. Waveform 161 represented in solid line format represents the difference effect in radial force implemented by the ablation pattern shown in FIG. 15. Waveform 162 represented in dashed line format shows the corrected levels of radial force achieved after application of the ablation pattern to selectively remove rubber from first and second tire beads.

Figure 17:
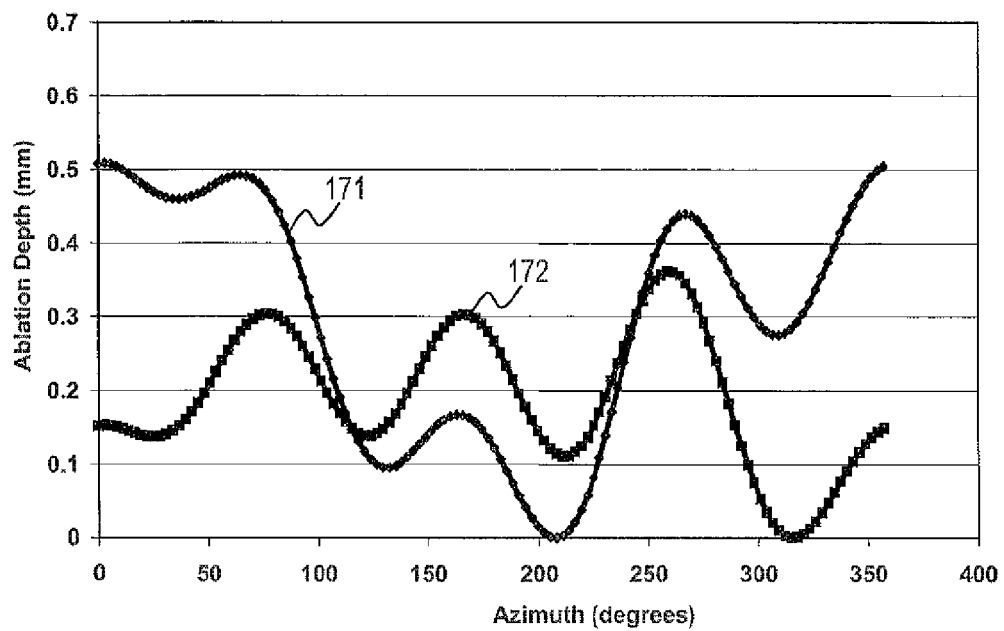
FIG. 17 provides a graphical illustration of calculated ablation patterns for first and second tire beads in order to correct for radial and lateral force variations, such as simulated by sum of the first through fourth harmonic components of radial force variation and first harmonic of lateral force variation as shown in FIGS. 13 and 14.
Figure 18:
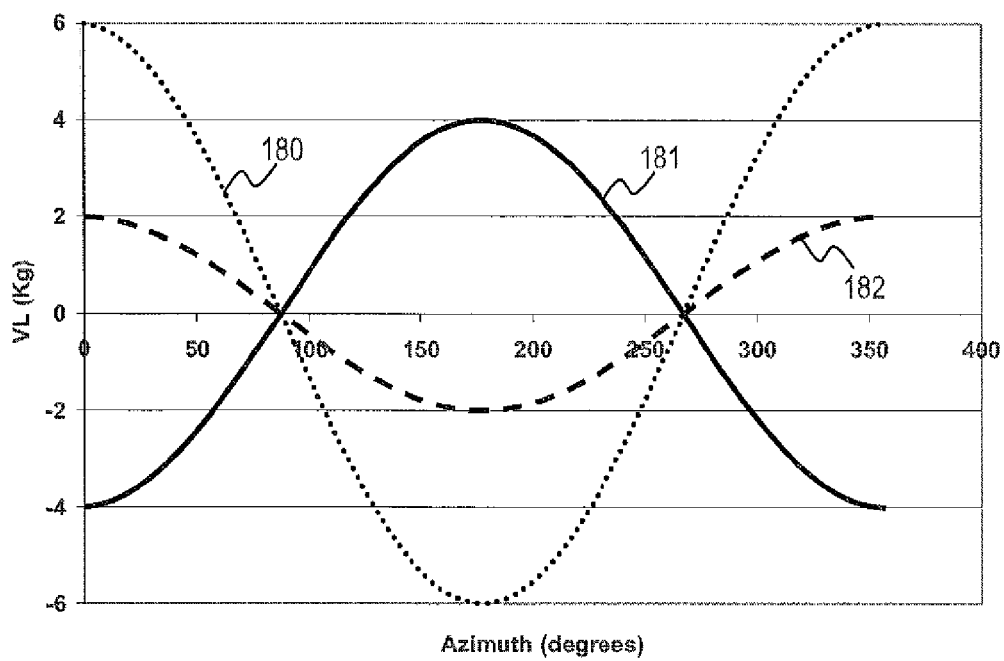
FIG. 18 provides a graphical illustration of simulated values for initial lateral force compared to corrected lateral force after implementing the ablation patterns of FIG. 17.

Referring now to the exemplary solution for correction of both radial and lateral force variations, an ablation pattern modeling the above correction scheme, and as may be calculated in accordance with the formulas disclosed herein is shown in FIG. 17. Ablation patterns are shown for both first and second tire beads, corresponding to waveforms 171 and 172. The improvement in radial force from the ablation pattern of FIG. 17 is similar to that shown in FIG. 16. FIG. 18 displays the improvement in lateral force variation that may be achieved by implementing actual ablation patterns as shown in FIG. 17. The initial waveform 180 represented in dotted line format represents initial lateral force for the $1^{st}$ harmonic. Waveform 181 represented in solid line format represents the difference effect in just lateral force (no radial force) implemented by the ablation patterns shown in FIG. 17. Waveform 182 represented in dashed line format shows the corrected levels of radial force achieved after application of the ablation pattern to selectively remove rubber from first and second tire beads.

Once an ablation pattern is calculated as described above, some embodiments of the present technology provide for various adjustments to the ablation pattern that may help achieve the desired effects. Such adjustments may be used when differences arise in the actual implementation of an ablation pattern due to such variations as the non-linear characteristics of the ablation removal technique (e.g., laser ablation).

Figure 19:
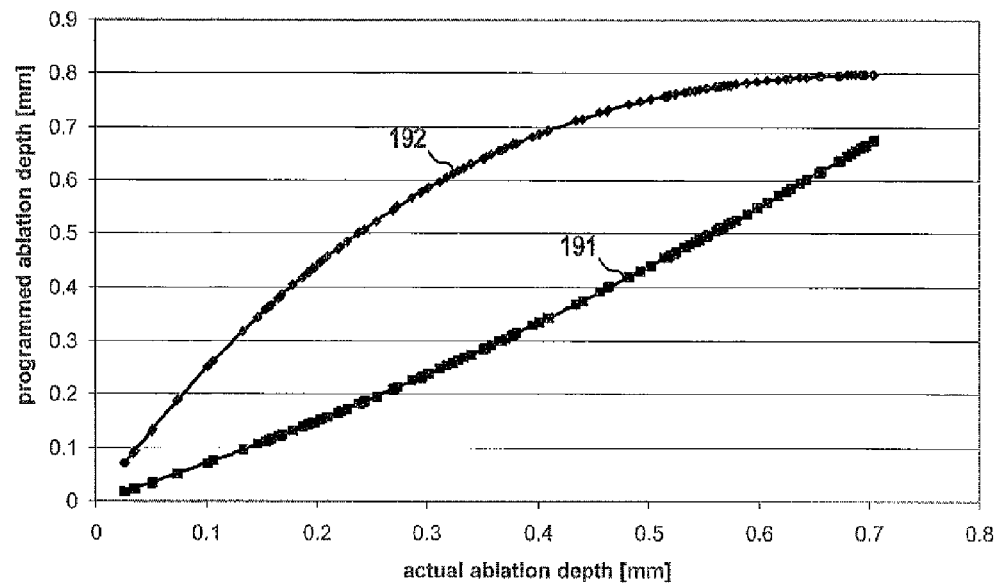
FIG. 19 provides a graphical illustration of depth correction for ablation non-linear characteristics, displaying a mapping of programmed ablation depth in mm along the ordinate to an actual ablation depth in mm along the abscissa.

FIG. 19 shows a mapping adjustment that could be used for correlating a desired ablation depth in mm (plotted across the ordinate) to an actual ablation depth in mm (plotted across the abscissa). Waveform 191 indicates an exemplary mapping function when variable power correction is employed (so tire rotational speed is fixed and laser power is varied to achieve desired ablation effects). The mapping function represented by waveform 191 may be in the form of a polynomial, such as a second-order polynomial. In this particular example, the polynomial is in the form $y=0.41x^2+0.67x$. Waveform 192 indicates an exemplary mapping function when variable speed correction is employed (so the laser power is fixed and tire rotational speed is varied to achieve desired ablation effects). The mapping function represented by waveform 192 may be in the form of a polynomial, such as a third-order polynomial. In this particular example, the polynomial takes the form $y=1.12x^3-3.14x^2+2.79x$.

Figure 20:
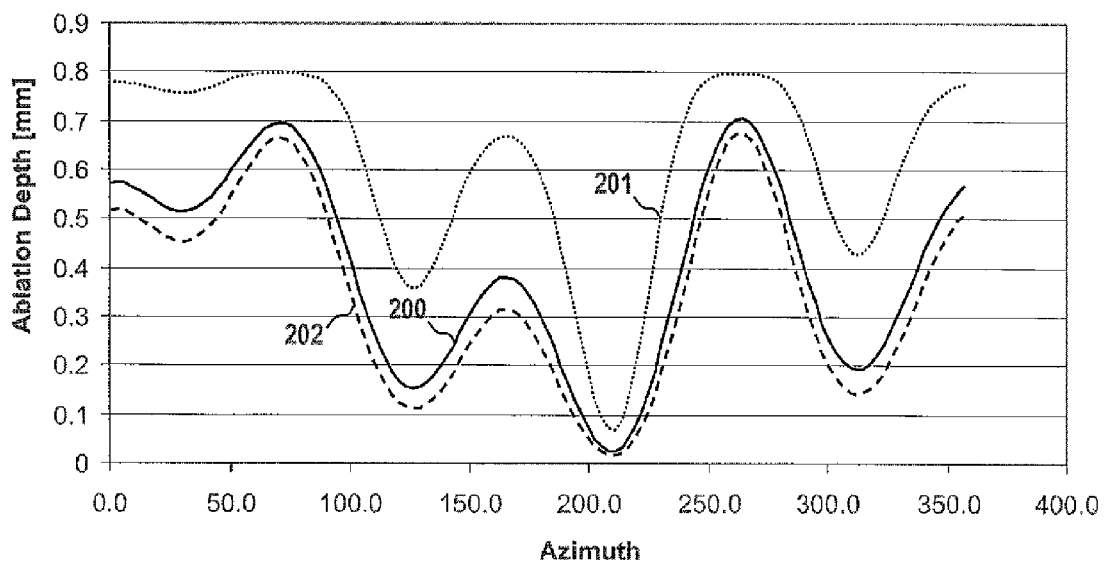
FIG. 20 provides a graphical illustration of adjusted ablation patterns after application of the mapping functions of FIG. 19, plotting the ablation depth in mm across the ordinate and azimuth in degrees across the abscissa for variable power and variable speed of ablation implementation.

FIG. 20 shows the resultant ablation patterns that are achieved after applying the mapping functions of FIG. 19. Waveform 200 (solid line) represents the desired ablation depth. Waveform 201 (dotted line) represents the ablation pattern adjusted after applying the mapping function 192 of FIG. 19, designed for variable speed. Waveform 202 (dashed line) represents the ablation pattern adjusted after applying the mapping function 191 of FIG. 19, designed for variable laser power.

Figure 21:
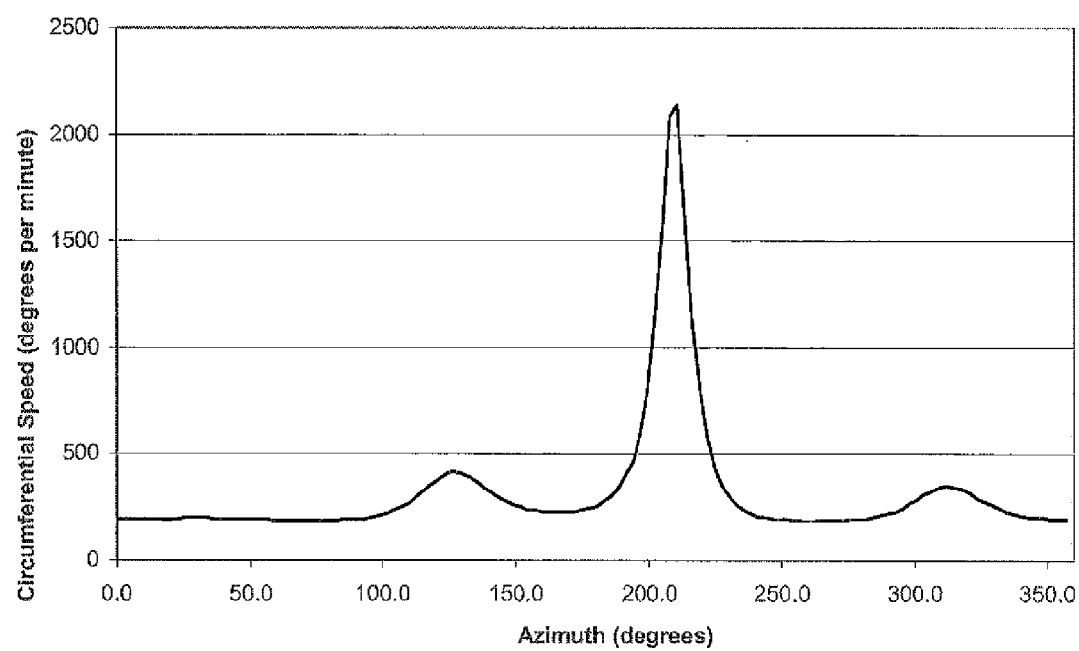
FIG. 21 provides a graphical illustration of an exemplary plot of tire circumferential speed in degrees per minute versus angular position in degrees for a constant-power, variable speed mode of implementing the disclosed ablation techniques.

When ablation patterns are to be applied for removal procedures in which the rotational speed of the tire will be varied, it is possible to determined a new ablation pattern expressed in terms of the circumferential speed (e.g., measured in degrees per minute) versus angular location (e.g., measured in degrees). An example of how an ablation pattern such as represented by waveform 201 in FIG. 20 may be expressed in terms of the speed versus angular position is shown in FIG. 21.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method for reducing a magnitude of one or more harmonics of one or more uniformity parameters in a cured tire, said method comprising the steps of:
    identifying one or more uniformity parameters and a selected number of harmonics for each parameter for which correction is desired;
    determining a plurality of different track locations for ablation defined along the profile of each tire bead, the plurality of different track locations including two or more of a bead seat, a low flange zone, and a high flange zone, the plurality of different track locations being determined based at least in part on a sensitivity associated with the bead seat, the low flange zone, and the high flange zone;
    calculating a plurality of ablation patterns for each tire bead to correct for the selected number of harmonics for each identified uniformity parameter, each pattern in the plurality of ablation patterns being designed for ablation at one of the plurality of different track locations defined along the profile of a tire bead in two or more of the bead seat, the low flange zone and the high flange zone; and selectively removing tire material along a first and second tire beads according to the plurality of ablation patterns calculated for each tire bead.

2. The method of claim 1, wherein each ablation pattern is calculated in accordance with the formula:

$$\text{Ablation}(\theta) = \sum_h Amp_k * \text{Cos}(\theta \cdot h + \varphi_h),$$

where Ablation($\theta$)=ablated depth at angular position $\theta$ around the tire bead, $Amp_k$=weighted correction amplitude for uniformity parameter k, h=Harmonic number and $\phi_h$ is the phase of harmonic h for parameter k.

3. The method of claim 2, wherein the harmonic phase $\phi_h$ is adjusted by 180 degrees for applicable portions of the ablation pattern on one or both of the first and second tire beads when the at least one uniformity parameter identified for correction comprises lateral force variation or if the track location for ablation comprises the low flange zone.

4. The method of claim 1, wherein the at least one uniformity parameter that is identified for correction comprises one or more of low and high speed radial force variation, lateral force variation, tangential force variation, radial run out, lateral run out, mass variance, conicity and ply steer.

5. The method of claim 1, wherein the selected number of harmonics comprises a plurality of harmonics.

6. The method of claim 1, wherein said step of selectively removing tire material comprises employing ablation at a fixed power level, while selectively rotating the cured tire with varied rotational speed.

7. The method of claim 1, wherein said step of selectively removing tire material comprises employing ablation at varied power levels, while rotating the cured tire at a fixed rotational speed.

8. The method of claim 1, wherein said step of calculating a plurality of ablation patterns more particularly comprises determining scaling factors to weight a desired level of correction for each uniformity parameter and track location for ablation.

9. The method of claim 1, wherein said step of selectively removing tire material comprises removing material along a selected angular portion of each tire bead, wherein the selected angular portion is less than an entire tire expanse of 360 degrees.

10. The method of claim 1, wherein said step of calculating a plurality of ablation patterns comprises adjusting the ablation pattern to account for nonlinearities in an actual ablation implementation.

* * * * *